(12) United States Patent
Olschner et al.

(10) Patent No.: US 7,899,948 B2
(45) Date of Patent: Mar. 1, 2011

(54) INTEGRATED INTERFACE APPARATUS AND METHOD OF OPERATING AN INTEGRATED INTERFACE APPARATUS

(75) Inventors: Britta Olschner, Munich (DE); Vincenzo Costa, Assling (DE); Henrik Icking, Munich (DE)

(73) Assignee: Infineon Technologies AG, Neubiberg (DE)

( * ) Notice: Subject to any disclaimer, the term of this patent is extended or adjusted under 35 U.S.C. 154(b) by 166 days.

(21) Appl. No.: 12/191,313

(22) Filed: Aug. 14, 2008

(65) Prior Publication Data

US 2009/0049206 A1 Feb. 19, 2009

(30) Foreign Application Priority Data

Aug. 16, 2007 (DE) ........................ 10 2007 038 725

(51) Int. Cl.
*G06F 3/00* (2006.01)

(52) U.S. Cl. .......................................... 710/14; 710/38

(58) Field of Classification Search .................... 710/14
See application file for complete search history.

(56) References Cited

U.S. PATENT DOCUMENTS

| 6,871,244 | B1* | 3/2005 | Cahill et al. ................... 710/62 |
| 7,021,971 | B2 | 4/2006 | Chou et al. |
| 2002/0071037 | A1 | 6/2002 | Haavisto |
| 2004/0160993 | A1* | 8/2004 | Ganton et al. ................. 370/537 |
| 2006/0085578 | A1* | 4/2006 | Hatakhri et al. ................ 710/62 |
| 2007/0028013 | A1 | 2/2007 | Nonoyama et al. |
| 2007/0177018 | A1* | 8/2007 | Holmes et al. .......... 348/207.99 |
| 2008/0080489 | A1* | 4/2008 | Lee et al. ..................... 370/357 |

* cited by examiner

*Primary Examiner*—Henry W Tsai
*Assistant Examiner*—Elias Mamo

(57) ABSTRACT

In an embodiment of the invention, an integrated interface apparatus for providing a serial differential data input for an integrated processor of a mobile radio terminal has a data reception apparatus having a physical layer which can be alternatively operated in a first operating mode according to a first interface standard or in a second operating mode according to a second interface standard, the first interface standard and the second interface standard not being compatible with one another with respect to the physical layer. In another embodiment of the invention, a method for operating an integrated interface apparatus is provided.

20 Claims, 2 Drawing Sheets

INTEGRATED INTERFACE APPARATUS AND METHOD OF OPERATING AN INTEGRATED INTERFACE APPARATUS

TECHNICAL FIELD

Embodiments of the invention relate generally to an integrated interface apparatus and to a method of operating an integrated interface apparatus.

BACKGROUND

In integrated apparatuses, that is to say apparatuses which are implemented by means of integrated circuits using semiconductor technology, it is generally desirable to keep the complexity and the required semiconductor basic area low in order to save costs and achieve small dimensions of the integrated circuits (IC, also referred to as "chip").

DESCRIPTION

According to an embodiment of the invention, an integrated interface apparatus for providing a serial differential data input for an integrated processor of a mobile radio terminal has a data reception apparatus having a physical layer which can be operated in a first operating mode according to a first interface standard or in a second operating mode according to a second interface standard, the first interface standard and the second interface standard not being compatible with one another with respect to the physical layer.

Another embodiment of the invention provides a method for operating an integrated interface apparatus for providing a serial differential data input for an integrated processor of a mobile radio terminal. The method has the steps of: operating a physical layer of a data reception apparatus of the integrated interface apparatus in a first operating mode according to a first interface standard, and operating the physical layer of the data reception apparatus of the integrated interface apparatus in a second operating mode according to a second interface standard, the first interface standard and the second interface standard not being compatible with one another with respect to the physical layer.

Embodiments of the invention are illustrated in the figures and are explained in more detail below. Further embodiments of the invention emerge from the dependent patent claims. Where applicable, the description of an apparatus analogously applies to the corresponding method and vice versa.

Figure 1:
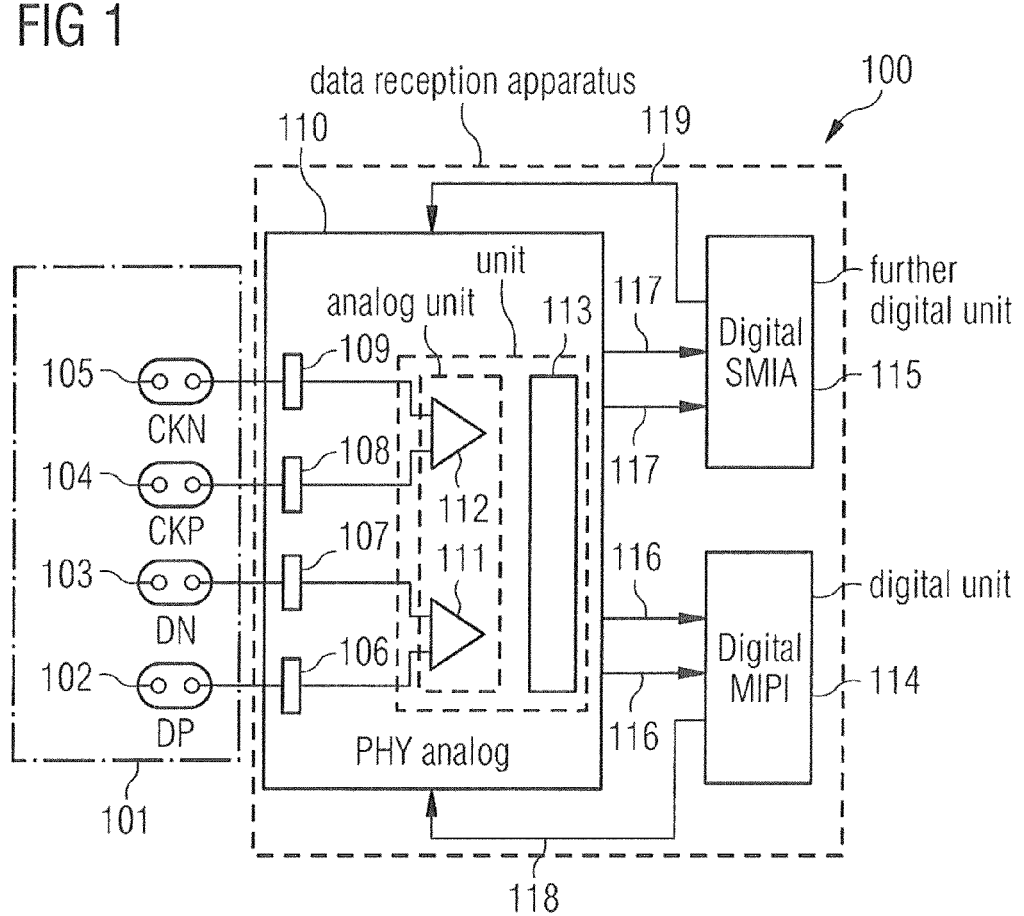
FIG. 1 shows a block diagram of an integrated interface apparatus according to one exemplary embodiment of the invention.

With reference to FIG. 1, a block diagram of an integrated interface apparatus 100 according to one exemplary embodiment of the invention is described in more detail below.

The interface apparatus 100 is used to connect a camera module to an integrated processor of a mobile radio terminal, for example a baseband processor IC or an application processor IC. The interface apparatus itself may be integrated together with the processor or may be integrated on a separate IC. For the purpose of simplification, only one direction of the data communication link is illustrated, namely data transmission from the camera to the processor, that is to say the data input from the point of view of the processor. Data are transmitted from the camera to the processor IC using a high-speed signal. In the opposite direction, monitoring signals or control data are transmitted from the IC to the camera.

The interface apparatus 100 provides a serial differential data input for the processor, via which the latter can receive the data coming from the camera. In this case, the interface apparatus enables a wider bandwidth and better power loss values than a parallel interface and is better suited to cameras having a high resolution, for example up to 5 million pixels or more.

Various, competing interface descriptions or interface standards have already been defined in industry for camera interfaces. For example, the MIPI (Mobile Industry Processor Interface) standardization group has defined a serial interface, so that an "MIPI camera" can be connected to "MIPI baseband" or an "MIPI application processor". The protocol layers of this interface (link layer and higher layers) are referred to as CSI-2 (Camera Serial Interface) and the associated physical layer is referred to as D-PHY. Another interface description which was defined by Nokia and ST Microelectronics is SMIA (Standard Mobile Imaging Architecture).

As regards the meaning of the terms physical layer, link layer etc., reference is made to the known 7-layer reference model for describing manufacturer-independent communication systems which is standardized by the ISO (International Organization for Standardization). The physical layer defines, for example, properties of the transmission media and transmission apparatuses, for example the type of transmission technology, data formats which can be transmitted, plug connections, wavelengths and signal levels. In this patent application, the term "physical layer" also denotes the units, devices and apparatuses which can be used to actually implement the functions of the physical layer of the descriptive reference model.

On account of the co-existence of the different interface descriptions, there are customer requirements for one interface type (for example MIPI) but also customer requirements for another interface type (for example SMIA). The physical layer of MIPI and the physical layer of SMIA are both so-called subLVDS standards (subLVDS is an abbreviation for the term "sub Low Voltage Differential Swing" which is known among experts and denotes a category of transmission technologies for interfaces) but are not compatible with one another. In particular, they operate at different voltage levels. If the desire were to use one product to satisfy the customer requirements for both interface types instead of for only one interface type and therefore both interface types were implemented, there would be a correspondingly higher level of implementation complexity and a correspondingly greater area requirement in the IC, for example twice the implementation complexity and twice the area requirement in the IC.

The interface apparatus 100 has a physical layer which can be alternatively operated in two operating modes: either SMIA or MIPI. It has been adapted to alternatively satisfy the requirements for both interface standards, which are not compatible with one another, depending on the operating mode. In comparison with implementation of two independent physical layers for SMIA and MIPI, the implementation complexity is reduced and the area required on the IC is reduced.

The physical layer of the interface apparatus 100 receives electrical input signals from a camera or a camera module via a connecting section 101. The connecting section has two connections for a differential data signal: DP 102 (DP=data positive) and DN 103 (DN=data negative). Furthermore, the connecting section has two connections for a differential clock signal: CKP 104 (CKP=clock positive) and CKN 105 (CKN=clock negative). The connecting section may, but need not, be part of the interface apparatus 100. For example, the connecting section is implemented using so-called housing connection pads on the housing of the IC containing the interface apparatus.

The four connections of the connecting section 101 are connected to a respective associated one of four contact-connection areas 106, 107, 108 and 109, also referred to as pads. The contact-connection areas 106, 107, 108 and 109 are implemented, for example, in the form of so-called bonding pads on the IC containing the interface apparatus and are connected to the associated connections of the connecting section by means of so-called bonding wires. Inside the IC, the contact-connection areas establish the connections of the downstream circuit parts for the incoming differential data and clock signals. In the operating mode according to SMIA, the differential data and clock signals are transmitted according to SMIA via the four contact-connection areas 106, 107, 108 and 109 of the IC and the differential data and clock signals are transmitted according to MIPI in the operating mode according to MIPI. The number of contact-connection areas (pads) required on the IC is halved and the area required on the IC is reduced in comparison with transmission of the signals via respective dedicated contact-connection areas according to MIPI or SMIA.

The interface apparatus 100 has an analog section 110 ("PHY analog") for processing analog input signals. The contact-connection areas 106, 107, 108 and 109 may be considered to be part of this analog section.

Furthermore, the analog section has a data input stage 111, which is connected to the connections 102 and 103 for the data signal via the contact-connection areas 106 and 107, and a clock input stage 112 which is connected to the connections 104 and 105 for the clock signal via the contact-connection areas 108 and 109. The data input stage 111 and the clock input stage 112 are used to convert the respective external analog differential signals into suitable signals in the IC, for example unipolar CMOS signals.

The input stages 111 and 112 are internally designed, in terms of circuitry, to process both signals according to SMIA and, alternatively, signals according to MIPI without control or a changeover from outside the input stages being required when changing from SMIA to MIPI or vice versa. In another exemplary embodiment, a control or changeover signal acts on the input stages 111 and 112, which signal gives rise to the change from an operating mode according to SMIA to an operating mode according to MIPI and vice versa. Electrical properties of the input stages are influenced by the control or changeover signal. Alternatively, the input stages 111 and 112 may also be permanently programmed to one of the operating modes according to SMIA or MIPI after the IC containing the interface 100 has been produced, depending on the customer requirement at that time, for example by means of so-called fusing. According to another exemplary embodiment, each of the two input stages 111 and 112 contains a signal path for SMIA and a separate signal path for MIPI, which paths are activated as required.

The analog section 100 also has a sampling and conversion unit 113 which samples the data signal provided by the data input stage 111 according to the clock signal provided by the clock input stage 112, converts it into a digital signal and outputs the latter to the next stage, for example in parallel data format. The sampling and conversion unit 113 can equally process data and clock signals according to SMIA and MIPI.

A dedicated MIPI digital section 114 ("Digital MIPI") and a separate dedicated SMIA digital section 115 ("Digital SMIA") are connected downstream of the analog section 100. In the operating mode according to MIPI, the digital signals output by the sampling and conversion unit 113 are transmitted, via the data lines 116, to the MIPI digital section 114 and are processed further by the latter in order to be able to make them available to the processor. In the operating mode according to SMIA, the digital signals output by the sampling and conversion unit 113 are transmitted, via the data lines 117, to the SMIA digital section 115 and are processed further by the latter in order to be able to make them available to the processor. The MIPI digital section 114 may control the analog section 110 via a control line 118 and the SMIA digital section 115 may control the analog section 110 via a control line 119.

Figure 2:
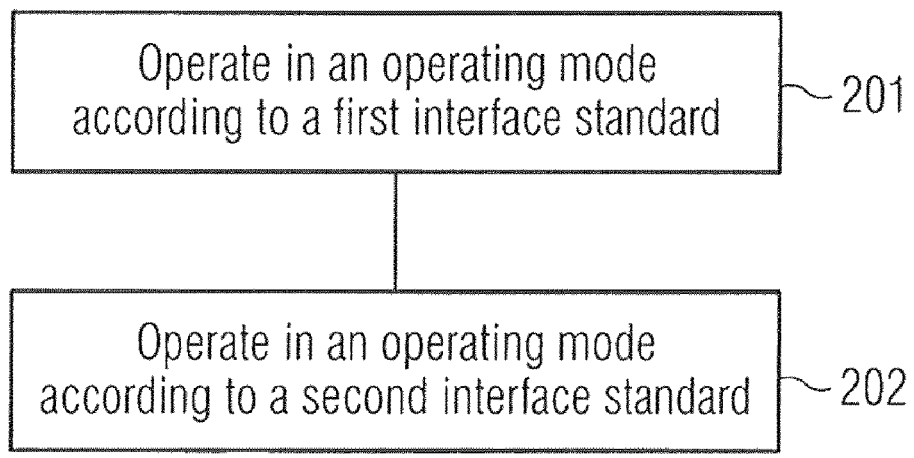
FIG. 2 shows a flowchart of a method according to one exemplary embodiment of the invention.

With reference to FIG. 2, a method for operating an integrated interface apparatus for providing a serial differential data input for an integrated processor of a mobile radio terminal according to one exemplary embodiment of the invention is described below.

In 201, a physical layer of a data reception apparatus of the integrated interface apparatus is operated in a first operating mode according to a first interface standard.

In 202, the physical layer of the data reception apparatus of the integrated interface apparatus is operated in a second operating mode according to a second interface standard. In this case, the first interface standard and the second interface standard are not compatible with one another with respect to the physical layer.

According to another exemplary embodiment, in the method illustrated in FIG. 2, input signals are transmitted via contact-connection areas of the physical layer according to the first interface standard in the first operating mode and input signals are transmitted via the same contact-connection areas of the physical layer according to the second interface standard in the second operating mode.

According to yet another exemplary embodiment, analog input signals are processed in the method illustrated in FIG. 2. Analog input signals according to the first interface standard and analog input signals according to the second interface standard pass through an identical signal path during processing.

According to yet another embodiment of the invention, the physical layer has a unit which is in a respectively used signal path both in the first operating mode and in the second operating mode.

According to yet another embodiment of the invention, the physical layer has contact-connection areas which are used to transmit input signals according to the first interface standard in the first operating mode and to transmit input signals according to the second interface standard in the second operating mode.

According to yet another embodiment of the invention, the contact-connection areas have two connections for a differential clock signal and two connections for a differential data signal.

According to yet another embodiment of the invention, the physical layer has an analog unit for processing analog input signals, in which input signals according to the first interface standard and input signals according to the second interface standard pass through an identical signal path.

According to yet another embodiment of the invention, the physical layer has a digital unit for processing digital signals according to the first interface standard and a further digital unit, which is different from said digital unit, for processing digital signals according to the second interface standard, the digital unit and the further digital unit being connected downstream of the analog unit.

According to yet another embodiment of the invention, the first interface standard or the second interface standard is an interface standard for reading the data from a camera into a processor of a mobile radio terminal.

According to yet another embodiment of the invention, the interface standard for reading the data from a camera into a processor of a mobile radio terminal is the MIPI standard or the SMIA standard.

What is claimed is:

1. An integrated interface apparatus for providing a serial differential data input for an integrated processor of a mobile radio terminal, said apparatus comprising a data reception apparatus comprising a physical layer configured to be operated in a first operating mode according to a first digital data interface standard or in a second operating mode according to a second digital data interface standard, the first digital data interface standard and the second digital data interface standard not being compatible with one another with respect to the physical layer, wherein both the first digital data interface standard and the second digital data interface standard being interface standards for reading data from a camera into a processor of a mobile radio terminal, and wherein the first digital data interface standard being the MIPI (Mobile Industry Processor Interface) standard and the second digital data interface standard being the SMIA (Standard Mobile Imaging Architecture) standard.

2. Integrated interface apparatus according to claim 1, the physical layer comprising a unit which is in a respectively used signal path both in the first operating mode and in the second operating mode.

3. Integrated interface apparatus according to claim 2, the physical layer further comprising contact-connection areas which are used to transmit input signals according to the first digital data interface standard in the first operating mode and to transmit input signals according to the second digital data interface standard in the second operating mode.

4. Integrated interface apparatus according to claim 3, the contact-connection areas comprising two connections for a differential clock signal and two other connections for a differential data signal.

5. Integrated interface apparatus according to claim 1, the physical layer comprising an analog unit to process analog input signals, in which input signals according to the first digital data interface standard and input signals according to the second digital data interface standard pass through an identical signal path.

6. Integrated interface apparatus according to claim 5, the physical layer further comprising a digital unit to process digital signals according to the first digital data interface standard and further comprising a further digital unit, which is different from said digital unit, to process digital signals according to the second digital data interface standard, the digital unit being connected downstream of the analog unit and the further digital unit being connected downstream of the analog unit.

7. Integrated interface apparatus according to claim 1, the first digital data interface standard and/or the second digital data interface standard being an interface standard for reading data from a camera into a processor of a mobile radio terminal.

8. Integrated interface apparatus according to claim 7, the interface standard for reading data from a camera into a processor of a mobile radio terminal being the MIPI standard or the SMIA standard.

9. A method of operating an integrated interface apparatus for providing a serial differential data input for an integrated processor of a mobile radio terminal, said method comprising:

operating a physical layer of a data reception apparatus of an integrated interface apparatus in a first operating mode according to a first digital data interface standard; and operating the physical layer of the data reception apparatus of the integrated interface apparatus in a second operating mode according to a second digital data interface standard, the first digital data interface standard and the second digital data interface standard not being compatible with one another with respect to the physical layer, wherein both the first digital data interface standard and the second digital data interface standard being interface standards for reading data from a camera into a processor of a mobile radio terminal, and wherein the first digital data interface standard being the MIPI (Mobile Industry Processor Interface) standard and the second digital data interface standard being the SMIA (Standard Mobile Imaging Architecture) standard.

10. Method according to claim 9, input signals being transmitted via contact-connection areas of the physical layer according to the first digital data interface standard in the first operating mode and input signals being transmitted via said contact-connection areas of the physical layer according to the second digital data interface standard in the second operating mode.

11. Method according to claim 9, analog input signals being processed, and analog input signals according to the first digital data interface standard and analog input signals according to the second digital data interface standard passing through an identical signal path during processing.

12. Method according to claim 9, the first digital data interface standard and/or the second digital data interface standard being an interface standard for reading data from a camera into a processor of a mobile radio terminal.

13. Method according to claim 12, the interface standard for reading data from a camera into a processor of a mobile radio terminal being the MIPI standard or the SMIA standard.

14. Method according to claim 9, further comprising providing a serial differential data input for an integrated processor of a mobile radio terminal.

15. Integrated interface apparatus according to claim 1, wherein the first digital data interface standard being the MIPI standard or the SMIA standard.

16. Method according to claim 9, wherein the first digital data interface standard being the MIPI standard or the SMIA standard.

17. An integrated interface apparatus for providing a serial differential data input for an integrated processor of a mobile radio terminal, said apparatus comprising a data reception apparatus comprising a physical layer configured to be operated in a first operating mode according to a first interface standard or in a second operating mode according to a second interface standard, the first interface standard and the second interface standard not being compatible with one another with respect to the physical layer, and both the first interface standard and the second interface standard being interface standards for reading data from a camera into a processor of a mobile radio terminal, wherein the first interface standard being the MIPI (Mobile Industry Processor Interface) standard and the second interface standard being the SMIA (Standard Mobile Imaging Architecture) standard.

18. Integrated interface apparatus according to claim 17, wherein the first interface standard being the MIPI standard or the SMIA standard.

19. A method of operating an integrated interface apparatus for providing a serial differential data input for an integrated processor of a mobile radio terminal, said method comprising:
 operating a physical layer of a data reception apparatus of an integrated interface apparatus in a first operating mode according to a first interface standard; and
 operating the physical layer of the data reception apparatus of the integrated interface apparatus in a second operating mode according to a second interface standard, the first interface standard and the second interface standard not being compatible with one another with respect to the physical layer, and both the first interface standard and the second interface standard being interface standards for reading data from a camera into a processor of a mobile radio terminal,
 wherein the first interface standard being the MIPI (Mobile Industry Processor Interface) standard and the second interface standard being the SMIA (Standard Mobile Imaging Architecture) standard.

20. Method according to claim 19, wherein the first interface standard being the MIPI standard or the SMIA standard.

* * * * *